United States Patent
Heindl

(10) Patent No.: US 9,434,252 B2
(45) Date of Patent: Sep. 6, 2016

(54) POWER TAKEOFF DRIVE SYSTEM FOR A VEHICLE

(71) Applicant: AGCO International GmbH, Hesston, KS (US)

(72) Inventor: Richard Heindl, Marktoberdorf (DE)

(73) Assignee: AGCO INTERNATIONAL GmbH, Neuhausen (CH)

(*) Notice: Subject to any disclaimer, the term of this patent is extended or adjusted under 35 U.S.C. 154(b) by 0 days.

(21) Appl. No.: 14/438,848

(22) PCT Filed: Nov. 5, 2013

(86) PCT No.: PCT/EP2013/072984
§ 371 (c)(1),
(2) Date: Apr. 27, 2015

(87) PCT Pub. No.: WO2014/095148
PCT Pub. Date: Jun. 26, 2014

(65) Prior Publication Data
US 2015/0291028 A1    Oct. 15, 2015

(30) Foreign Application Priority Data

Dec. 21, 2012  (GB) .................................. 1223544.6

(51) Int. Cl.
*B60K 25/00* (2006.01)
*B60K 17/28* (2006.01)
*B60K 25/02* (2006.01)

(52) U.S. Cl.
CPC .............. *B60K 25/00* (2013.01); *B60K 17/28* (2013.01); *B60K 25/02* (2013.01); *B60Y 2200/221* (2013.01); *B60Y 2400/422* (2013.01)

(58) Field of Classification Search
CPC ...... B60K 25/00; B60K 17/28; B60K 25/02; B60Y 2400/422; B60Y 2200/221
See application file for complete search history.

(56) References Cited

U.S. PATENT DOCUMENTS 1,907,794 A * 5/1933 Griswold ................ F16D 11/10
                                                    192/53.5
4,464,137 A * 8/1984 Jennings ................. F16D 7/025
                                                    464/160

(Continued)

FOREIGN PATENT DOCUMENTS

EP    0113495 A1    7/1984
EP    0587273 A1    3/1994

(Continued)

OTHER PUBLICATIONS

European Receiving Office; International Search Report for International Application No. PCT/EP2013/072984; mailing date Feb. 4, 2014.

(Continued)

*Primary Examiner* — Paul N Dickson
*Assistant Examiner* — Timothy Wilhelm

(57) ABSTRACT

A system for transmitting power from an engine shaft to a power take-off (PTO) shaft of a utility vehicle, comprising a transmission having an input shaft coupled to the engine shaft and an output driveably connectable to one or more driven axles of the vehicle. A synchronised shift device is operable to selectively connect an output shaft thereof to one of the transmission input shaft and output, said output shaft further being driveably connectable to the PTO shaft. The synchronised shift device comprises inner and outer coaxially aligned and respectively rotatable input bodies alternately connectable to the shift device output shaft, with the inner input body connected to the transmission input shaft and the outer input body driveably connected to the transmission output. The arrangement provides switching between engine speed and ground speed operation of the PTO.

8 Claims, 4 Drawing Sheets

(56) References Cited

U.S. PATENT DOCUMENTS

| | | | | | |
|---|---|---|---|---|---|
| 4,498,356 | A * | 2/1985 | Vater | ................... | B60K 17/344 74/15.63 |
| 5,248,283 | A * | 9/1993 | Eckhardt | ................... | F16D 3/72 464/149 |
| 5,449,329 | A * | 9/1995 | Brandon | ............... | F16H 61/061 477/143 |
| 5,573,471 | A * | 11/1996 | Shubinsky | ............ | F16H 37/046 475/207 |
| 6,112,870 | A * | 9/2000 | Fukumoto | ............. | B60W 10/02 192/103 C |
| 6,190,280 | B1 * | 2/2001 | Horsch | ................. | F16H 37/042 475/209 |
| 6,523,429 | B2 * | 2/2003 | Desmarchelier | ........ | F16H 3/089 74/15.4 |
| 7,063,638 | B2 * | 6/2006 | Weeramantry | .......... | F16H 47/04 475/74 |
| 7,771,314 | B2 * | 8/2010 | Eguchi | ...................... | B60T 7/02 477/109 |
| 7,854,281 | B2 * | 12/2010 | Maezawa | ............... | B60K 25/06 180/53.6 |
| 8,858,392 | B2 * | 10/2014 | Dix | ....................... | F16H 61/438 477/68 |
| 8,984,973 | B1 * | 3/2015 | Brenninger | ............ | B60K 17/02 74/15.4 |
| 9,145,053 | B2 * | 9/2015 | Mettler | ................... | B60K 17/28 |
| 2002/0043121 | A1 | 4/2002 | Desmarchelier et al. | | |
| 2003/0125150 | A1 * | 7/2003 | Tanzer | ..................... | F16H 3/54 475/150 |
| 2003/0162619 | A1 * | 8/2003 | Rodeghiero | ........... | B60K 17/28 475/73 |
| 2005/0172740 | A1 * | 8/2005 | Ebihara | .................. | B60K 17/28 74/15.4 |
| 2009/0145251 | A1 * | 6/2009 | Benassi | .................. | B60K 17/28 74/15.6 |
| 2015/0300422 | A1 * | 10/2015 | Heindl | ................... | F16D 23/06 74/15.82 |

FOREIGN PATENT DOCUMENTS

| | | |
|---|---|---|
| EP | 1798096 A2 | 6/2007 |
| EP | 1980438 A1 | 10/2008 |
| SU | 795997 A1 | 1/1981 |
| SU | 1449372 A1 | 1/1989 |
| WO | 2013064371 A1 | 5/2013 |

OTHER PUBLICATIONS

Intellectual Property Office; International Search Report for UK Patent Application No. GB1223544.6; transmittal letter dated Sep. 9, 2013.

* cited by examiner

POWER TAKEOFF DRIVE SYSTEM FOR A VEHICLE

BACKGROUND OF THE INVENTION

1. Field of Invention

The invention relates to power takeoff (PTO) drive systems for utility vehicles and, in particular, for agricultural tractors.

2. Description of Related Art

For many years agricultural tractors have been fitted with PTO systems which allow the transfer of torque from the prime mover to an attached implement. Examples of implements that utilise PTO systems include balers, fertilizer spreaders, seed drills and hedge cutters to name but a few.

Some implements, tillage implements for example, are power hungry and place a constant high load upon the PTO typically operating at the nominal engine speed to deliver the optimum efficiency. Other implements such as fertilizers spreaders place a low load upon the PTO but still demand the maximum speed. The demanded PTO speed dictates the speed at which the engine must be run due to the direct mechanical connection between the engine and the output PTO stub. In the case of low load at applications this results in excessive fuel consumption and noise.

Some implements demand a constant ratio between the groundspeed and the PTO speed. Some tractors provide a groundspeed PTO mode wherein the propulsion drive to the wheels is directly coupled by meshed gears to the PTO stub. The ratio between groundspeed and PTO speed in such a mode is fixed by the gears installed during manufacture and the size of tyre fitted.

Where a groundspeed PTO mode is provided, problems may occur when switching between groundspeed and engine speed PTO drive. For example, where the groundspeed PTO is connected to the front or rear axle driveline, the PTO cannot be switched under load and issues such as interlocking between tractor and implement during turns cannot be avoided.

But engaging the groundspeed PTO under load may be advantageous when a tractor and a trailer with driven axle is operated under changing conditions so that the driver can engage the driven trailer axle without stopping the vehicle. E. g. a tractor with a hauling container is used to unload a forage harvester. When the hauling trailer gets heavier due to loaded crops, the driver can engage the driven trailer axle without having to stop the vehicle during overloading.

It is an object of the invention to provide a PTO drive system for a utility vehicle such as an agricultural tractor which at least alleviates some the aforementioned problems.

OVERVIEW OF THE INVENTION

In accordance with a first aspect of the invention there is provided a system for transmitting power from an engine shaft to a PTO shaft of a utility vehicle, comprising:
 a transmission having an input shaft coupled to the engine shaft and an output body driveably connectable to one or more driven axles of the vehicle;
 a synchronised shift device operable to selectively connect an output shaft thereof to one of the transmission input shaft and output body, said output shaft further being driveably connectable to the PTO shaft;
 wherein the synchronised shift device comprises inner and outer coaxially aligned and respectively rotatable input bodies alternately connectable to the shift device output shaft, with the inner input body connected to the transmission input shaft and the outer input body driveably connected to the transmission output body.

Through this arrangement, a user may engage groundspeed PTO operation under load.

Suitably, the synchronised shift device inner input body is axially aligned with, and directly connected to, the transmission input shaft, with the outer input body coupled to the transmission output body by means such as a gear output shaft. The synchronised shift device output shaft is suitably driveably connectable to the PTO shaft through a clutch mechanism, such as a torque-limiting clutch mechanism or friction clutch mechanism, such as to permit control of the PTO torque in both engine speed and groundspeed modes.

BRIEF DESCRIPTION OF THE DRAWINGS

Embodiments of the present invention will now be described by way of example only, and with reference to the accompanying drawings, in which.

DETAILED DESCRIPTION OF THE INVENTION

Figure 1:
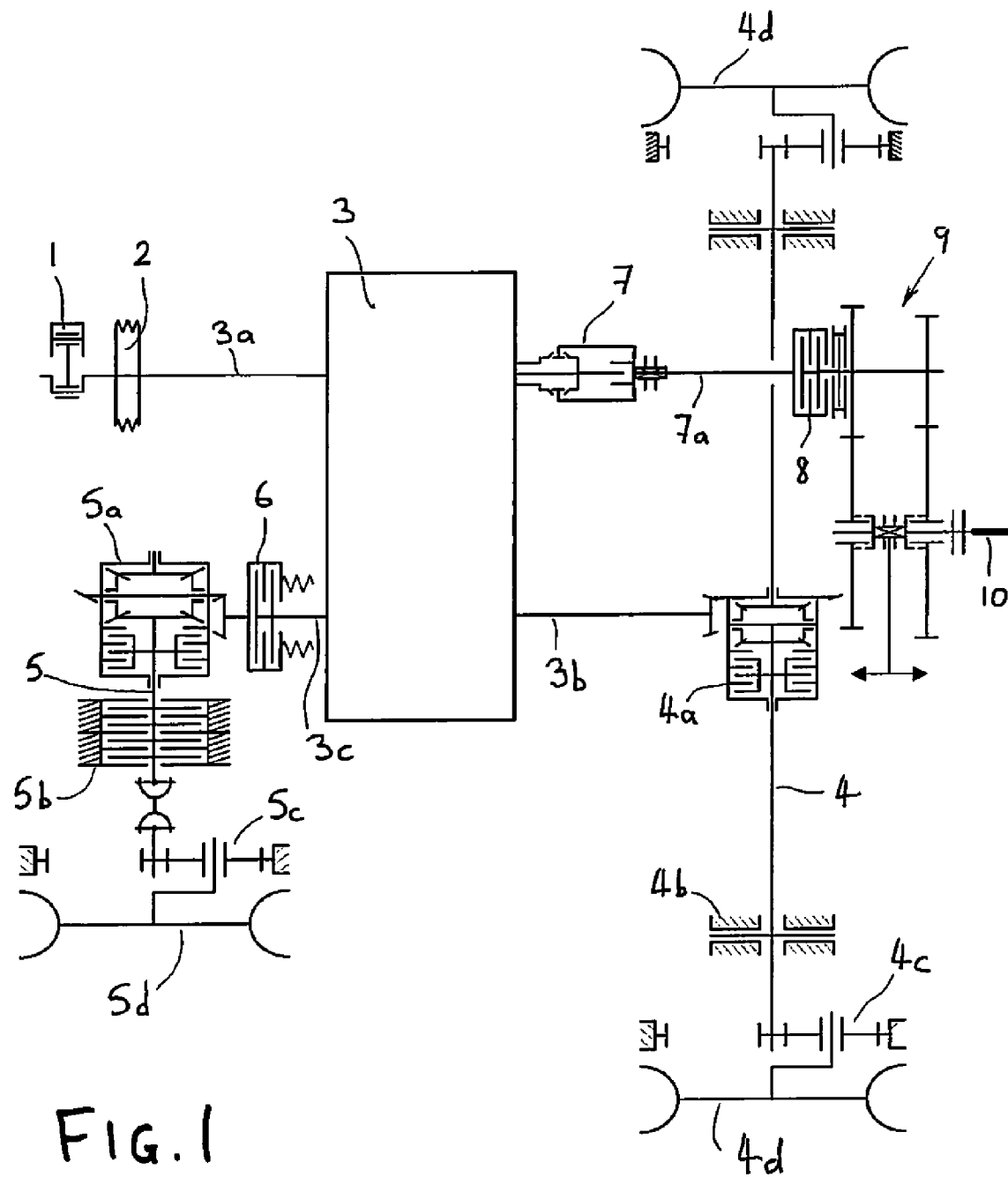
FIG. 1 shows a first configuration of utility vehicle driveline including means for driving a PTO shaft embodying the invention.

Beginning with the driveline arrangement of FIG. 1, a prime mover such as an internal combustion engine 1 drives an input shaft 3a of a gearbox/transmission unit 3 via flywheel 2. The transmission unit 3 may be configured to adapt gear ratios in a stepped or continuously variable mode to drive first 3b and second 3c output shafts.

Output shaft 3b drives the vehicle rear axle 4 via rear axle differential 4a. The rear axle assembly further comprises rear axle brakes 4b, rear axle final drives 4c, and rear wheels 4d. In like manner, output shaft 3c drives the vehicle front axle 5, with the front axle assembly further comprising differential 5a, brakes 5b, final drive 5c and front wheels 5d. Between the output shaft 3c and front axle differential 5a there is provided an all-wheel drive (AWD) clutch mechanism 6 by operation of which the drive to the vehicle front wheels may be selectively engaged or disengaged.

Also connected to the transmission 3 is a synchronised shift device 7 operable to couple an output shaft 7a thereof with either the input shaft 3a or an output of the transmission in dependence on whether engine speed or groundspeed PTO operation is required. Further details of the construction and operation of shift device 7 are given below with reference to the embodiment of FIGS. 3 and 4.

Via clutch assembly 8 and PTO gearbox 9, the synchronised shift device output shaft 7a drives the PTO shaft 10.

The clutch assembly 8 is a friction clutch enabling the ground speed PTO to be engaged under load.

Figure 2:
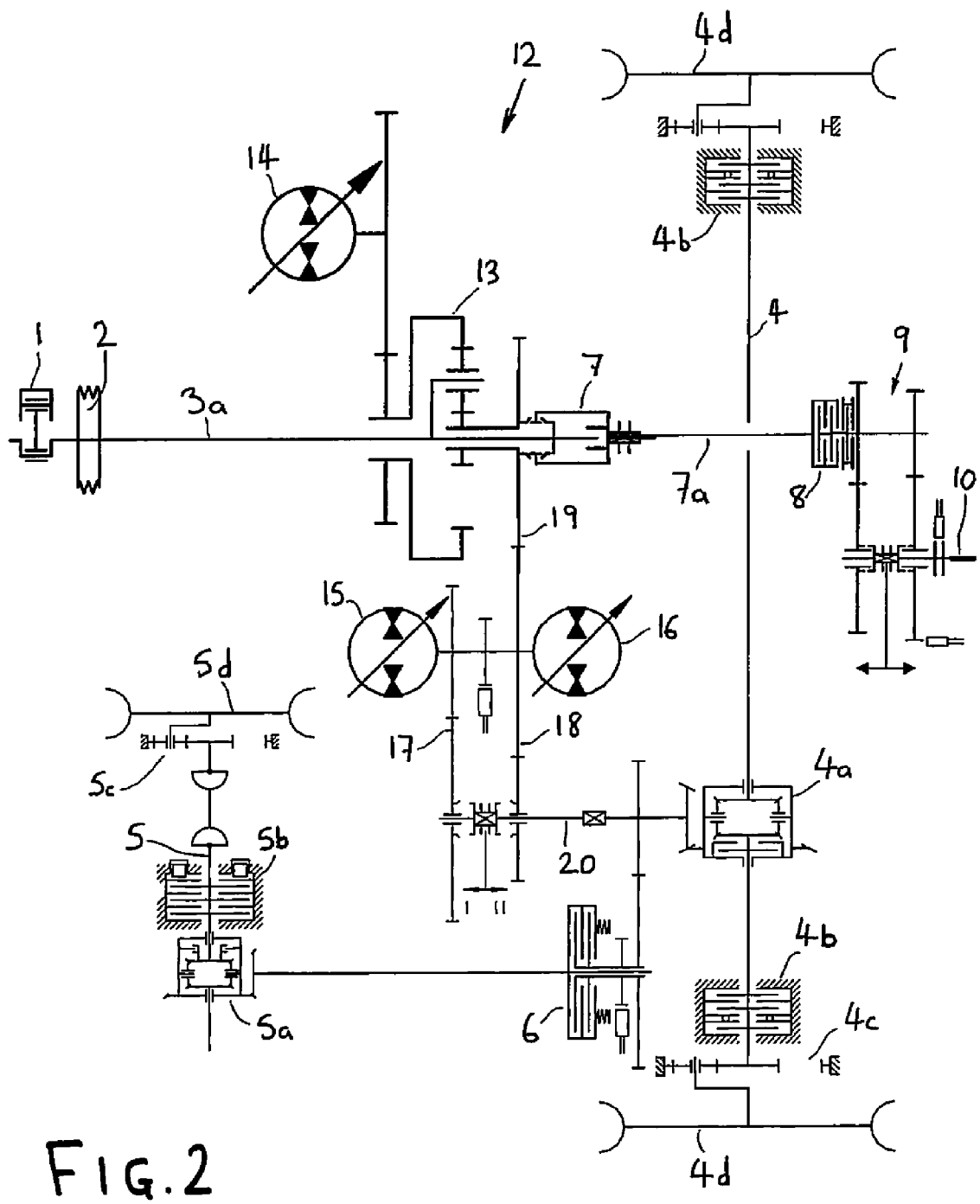
FIG. 2 shows a further configuration of utility vehicle driveline having a power split transmission arrangement.

FIG. 2 shows an alternative driveline arrangement having a power split transmission arrangement (indicated generally at 12) in place of the transmission 3 of FIG. 1. Planetary or epicyclic gearing 13 separates the torque delivered by the engine 1 for mechanical and hydrostatic branches, with the hydrostatic branch including a pump 14 driven via the planetary gearing 13. In turn, the pump 14 supplies pressurised fluid to first and second hydrostatic motors 15, 16

(the fluid connection is omitted for reasons of clarity). Through gearing 17, 18 the hydrostatic motors 15, 16 drive an output shaft 20 delivering driving torque to both front 5a and rear 4a axle differentials.

The synchronised shift device 7 is operable to selectively connect its output shaft 7a to one of the transmission input shaft 3a (for engine speed PTO operation) or transmission output body or shaft 20, via gearing 18, 19 (for ground speed operation). As schematically shown, the synchronised shift device comprises inner and outer coaxially aligned and respectively rotatable input bodies alternately connectable to the shift device output shaft, with the inner input body connected to the transmission input (engine output) shaft and the outer input body or shaft driveably connected to the transmission output.

Figure 3:
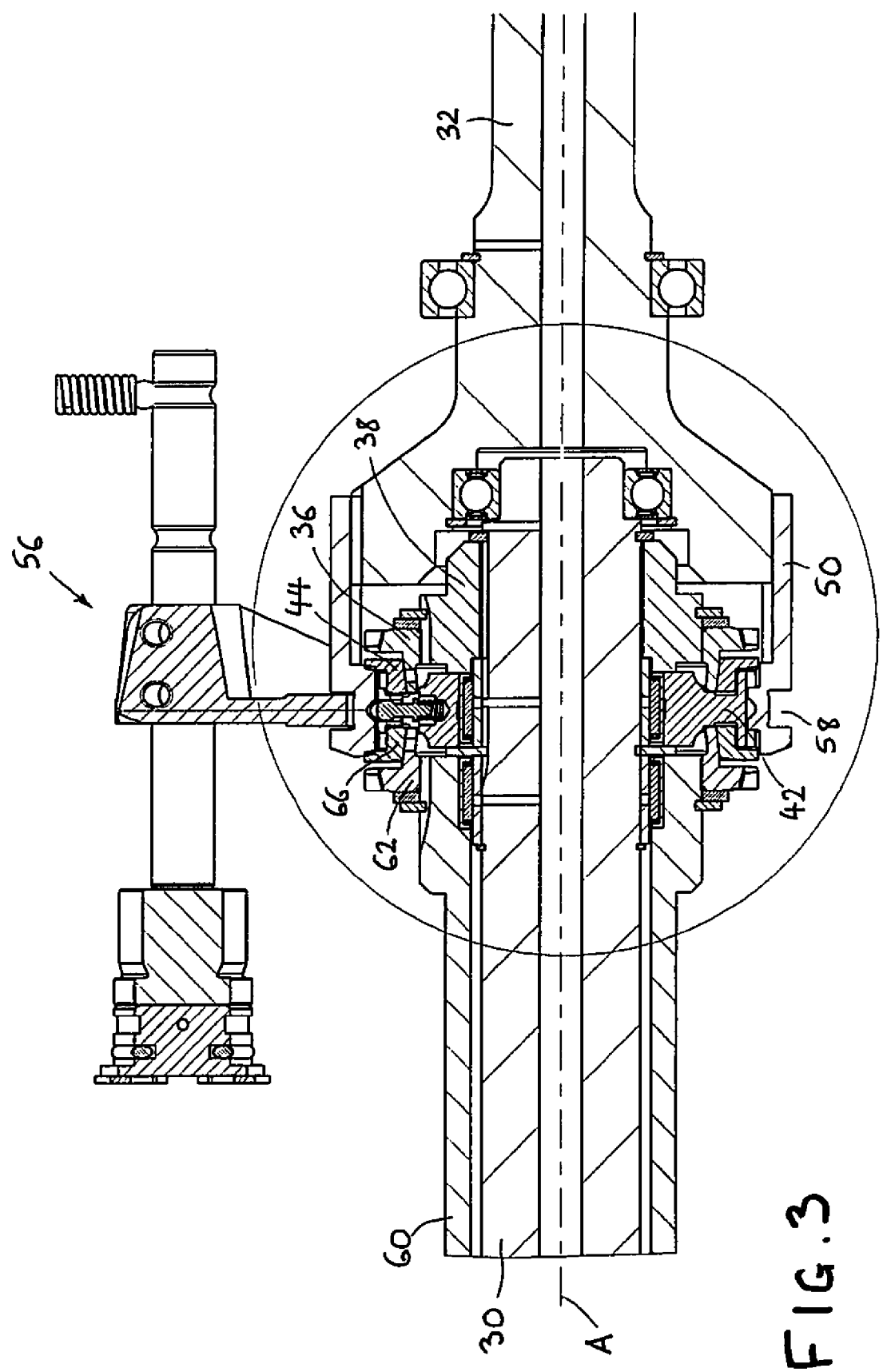
FIG. 3 shows in sectional view a synchronised shift device for use in the driveline configurations of FIG. 1 or 2.
Figure 4:
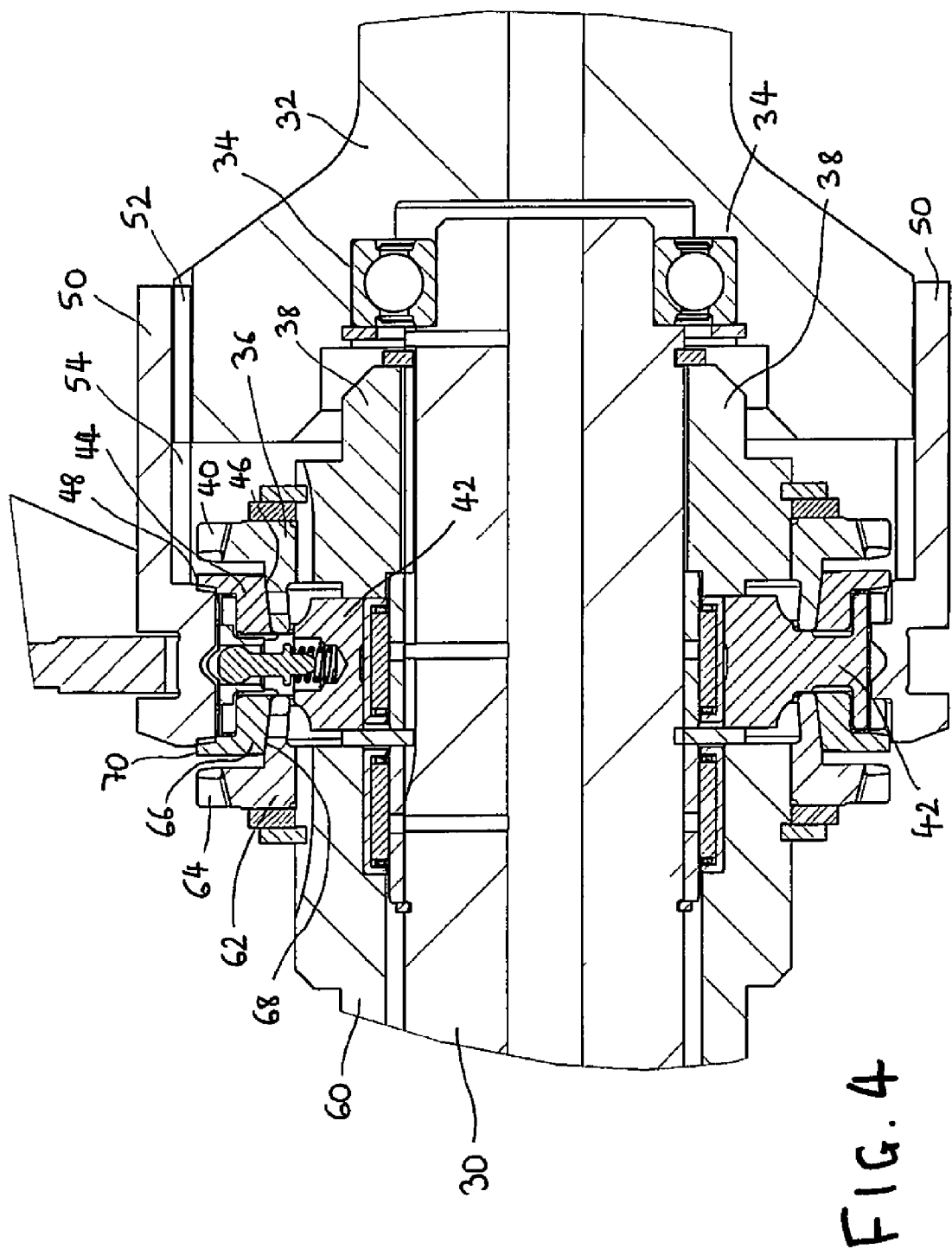
FIG. 4 is an enlargement of part of the view of FIG. 3.

FIGS. 3 and 4 show an embodiment of the shift device which comprises a first input shaft 30 axially aligned with, and connectable to (in a manner to be described), an output shaft 32. Bearings 34 support an end of the input shaft 30 within a recessed end portion of the output shaft 32 and permit the two shafts to rotate relative to one another and about the common axis A.

A first annular drive body 36, 38 is coaxially and fixedly mounted on the first input shaft 30 and has a plurality of teeth 40 on a radial outer surface thereof. A synchronisation body 42 is rotatably mounted on the first input shaft 30 adjacent the first annular drive body 36, 38. A first annular coupling element 44 is rotatably mounted relative to the first annular drive body and driveably engageable therewith through respective friction surfaces 46. The coupling element 44 has a plurality of teeth 48 on a radial outer surface thereof.

A synchronisation sleeve 50 is disposed about the first annular drive body 36, 38, synchronisation body 42 and first annular coupling element 44, the sleeve having teeth on an inner surface thereof and being slidable in an axial direction of the first input shaft from a first disengaged position (as shown), through an intermediate position wherein the teeth of the sleeve engage the teeth 48 of the first annular coupling element 44 and thereby drive engagement of the first annular coupling element and first annular drive body, to an engaged position wherein the teeth of the sleeve engage the teeth 40 of the first annular drive body.

The second shaft 32 has external gearing 52 over a part of the length thereof, which external gearing remains in driving engagement with gearing 54 on a part of the inner surface of the synchronisation sleeve in all positions of the synchronisation sleeve. As shown generally at 56 in FIG. 3, a control mechanism engages with a recess 58 in the outer surface of the sleeve 50 to control the movement of the sleeve from disengaged to engaged positions.

In operation, as the sleeve 50 is moved to an intermediate position, the engagement of the friction surfaces 46 between the first annular drive body 36 and first annular coupling element 44 cause the coupling element 44 and sleeve 50 (and thereby also the output shaft 32) to commence rotation at the same speed as the first annular drive body 36 and first input shaft 30 before full engagement by the teeth 40 of the first annular drive body 36 with the sleeve 50.

Providing a third torque connection to the unit, a third shaft 60 (used here as a second input) coaxially and rotatably disposed about the first shaft 30. A second annular drive body 62 is coaxially and fixedly mounted on the third shaft adjacent the synchronisation body 42 and, as for the first annular drive body, it has a plurality of teeth 64 on a radial outer surface thereof. A second annular coupling element 66 is rotatably mounted relative to the second annular drive body 62 and is driveably engageable therewith through friction surfaces 68. The second annular coupling element 66 has a plurality of teeth 70 on a radial outer surface thereof.

In like manner to the connection of the first shaft 30, the synchronisation sleeve 50 is slidable (to the left as it appears in the Figure) through a second intermediate position wherein the teeth of the sleeve engage the teeth 70 of the second annular coupling element 66 and thereby drive engagement of the second annular coupling element 66 and second annular drive body 62 through friction surfaces 68, to a second engaged position wherein the teeth of the sleeve engage the teeth 64 of the second annular drive body. As before, the rotation speeds of the third shaft 60 and output shaft 32 are synchronised before the coupling engagement of teeth 64 and sleeve 50.

In use in the drivelines of FIGS. 1 and 2, the first shaft 30 is connected directly to the engine output/transmission input shaft 3a whilst the third shaft 60 is driveably connected (for example through gearing 18, 19) to the transmission output. In this way, the unit 7 provides a synchronised shift for the PTO shaft between engine speed and groundspeed operation.

In the foregoing, the applicants have described a system for transmitting power from an engine shaft to a power take-off (PTO) shaft of a utility vehicle, comprising a transmission having an input shaft coupled to the engine shaft and an output driveably connectable to one or more driven axles of the vehicle. A synchronised shift device is operable to selectively connect an output shaft thereof to one of the transmission input shaft and output, said output shaft further being driveably connectable to the PTO shaft. The synchronised shift device comprises inner and outer coaxially aligned and respectively rotatable input bodies alternately connectable to the shift device output shaft, with the inner input body connected to the transmission input shaft and the outer input body driveably connected to the transmission output. The arrangement provides switching between engine speed and ground speed operation of the PTO.

From reading of the present disclosure, other modifications will be apparent to those skilled in the art and the scope of the invention is limited only by the following claims.

The invention claimed is:

1. A system for transmitting power from an engine shaft to a PTO shaft of a utility vehicle, comprising:
   a transmission having an input shaft coupled to the engine shaft and an output body driveably connectable to one or more driven axles of the vehicle;
   a synchronised shift device operable to selectively connect an output shaft thereof to one of the transmission input shaft and output body, said output shaft further being driveably connectable to the PTO shaft;
   wherein the synchronised shift device comprises inner and outer coaxially aligned and respectively rotatable input bodies alternately connectable to the shift device output shaft, with the inner input body connected to the transmission input shaft and the outer input body driveably connected to the transmission output body, and wherein the synchronised shift device comprises:
   a. the inner input body;
   b. a first annular drive body coaxially and fixedly mounted on the inner input body and having a plurality of teeth on a radial outer surface thereof;
   c. a synchronisation body rotatably mounted on the inner input body adjacent the first annular body;

d. a first annular coupling element rotatably mounted relative to the first annular drive body and driveably engageable therewith, said coupling element having a plurality of teeth on a radial outer surface thereof;

e. a synchronisation sleeve disposed about the first annular drive body, synchronisation body and first annular coupling element, the sleeve having teeth on an inner surface thereof and being slidable in an axial direction of the inner input body from a first disengaged position, through an intermediate position wherein the teeth of the sleeve engage the teeth of the first annular coupling element and thereby drive engagement of the first annular coupling element and first annular drive body, to an engaged position wherein the teeth of the sleeve engage the teeth of the drive body; and f. the output shaft having external gearing over a part of the length thereof, said external gearing being in driving engagement with gearing on a part of the inner surface of the synchronisation sleeve in all positions of the synchronisation sleeve.

2. A system as claimed in claim 1, wherein the synchronised shift device further comprises:

a. the outer input body coaxially and rotatably disposed about the inner input body;

b. a second annular drive body coaxially and fixedly mounted on the outer input body adjacent the synchronisation body and having a plurality of teeth on a radial outer surface thereof;

c. a second annular coupling element rotatably mounted relative to the second annular drive body and driveably engageable therewith, said second annular coupling element having a plurality of teeth on a radial outer surface thereof;

wherein the synchronisation sleeve is slidable through a second intermediate position wherein the teeth of the sleeve engage the teeth of the second annular coupling element and thereby drive engagement of the second annular coupling element and second annular drive body, to a second engaged position wherein the teeth of the sleeve engage the teeth of the second annular drive body.

3. A system as claimed in claim 1, wherein the engagement of annular drive body and annular coupling element is through respective friction surfaces.

4. A system as claimed in claim 1, wherein the synchronised shift device inner input body is axially aligned with, and directly connected to, the transmission input shaft.

5. A system as claimed in claim 1, wherein the synchronised shift device outer input body is coupled to the transmission output body by a gear output shaft.

6. A system as claimed in claim 1, wherein the synchronised shift device output shaft is driveably connectable to the PTO shaft through a clutch mechanism.

7. A system as claimed in claim 6, wherein the clutch mechanism is a torque-limiting clutch mechanism.

8. A system as claimed in claim 6, wherein the clutch mechanism is a friction clutch mechanism.

* * * * *